United States Patent Office

3,784,702
Patented Jan. 8, 1974

3,784,702
ANTI-TUSSIVE COMPOSITIONS
Eugene Tatsuru Kimura, Morton Grove, and David John Anderson, Mundelein, Ill., assignors to Abbott Laboratories, North Chicago, Ill.
No Drawing. Filed Jan. 14, 1972, Ser. No. 217,944
Int. Cl. A61k 27/00
U.S. Cl. 424—317           9 Claims

ABSTRACT OF THE DISCLOSURE

Covers a method of treating patients requiring anti-tussive therapy by administering to said patient an effective dose of a composition selected from the group consisting of 2-phenylbutyric acid, diethylaminoethoxy-ethanol, mixtures of 2-phenylbutyric acid, and diethyl-aminoethoxy-ethanol, and medicinally acceptable acid or base addition salts of the foregoing; and a pharmaceutical carrier.

DETAILED DESCRIPTION OF THE INVENTION

The present invention relates to a novel method for producing an anti-tussive effect in warmblooded animals by administering an effective dose of a composition comprising (a) a member selected from the group consisting of 2 - phenylbutyric acid, diethylaminoethoxy - ethanol, mixtures of 2-phenylbutyric acid and diethylaminoethoxy-ethanol, and medicinally acceptable acid or base addition salts of the foregoing and (b) a pharmaceutical carrier.

The just-mentioned compounds are known and described in the literature and need little elaboration. However, we have found here that such compounds exhibit an anti-tussive property and can be administered to warm-blooded animals for example, mammals, for the purpose of treating coughs and various disorders and irritations etc. causing cough. Thus, the compositions of the invention are useful in alleviating the symptoms of pertussis, tonsilitis, the common cold and inflammatory conditions of the upper respiratory tract complicated by severe cough.

The compounds of the present invention may be administered in any of the usual routes e.g., parenteral, rectal, and intravenous routes or the like. A preferred route of administration is the oral route. For such oral administration, the incorporation of a pharmaceutical carrier for the formation of a pharmaceutical composition is desirable, though not essential. Such suitable pharmaceutical compositions include without limitation, tablets, capsules, powders, solutions, suspensions, sustained release formulations and the like.

To produce dosage units for peroral application, the compounds here may be combined, e.g., with solid pharmaceutically acceptable pulverulent carriers such as lactose, saccharose, sorbitol and mannitol; starches such as potato starch, corn starch or amylopectin, also laminaria powder or citrus plup powder; cellulose derivatives or gelatin, etc. In addition, lubricants such as magnesium or calcium stearate or polyethylene glycols (Carbowaxes) of suitable molecular weight may be added to form tablets or press coated tablets. The latter are coated, for example, with concentrated sugar solutions which contain, for example, gum arabic, talcum and/or titanium dioxide, or they can be coated with a lacquer dissolved in easily volatile, organic solvents or a mixture of organic solvents. Dyestuffs can be added to these coatings, for example, to distinguish between different contents of active substance. The compounds disclosed for use here may be compressed into tablets which are stable at ordinary temperature. In addition, such compounds are non-hygroscopic.

Hard gelatin capsules contain, for example, granulates of the active ingredients with solid pulverulent carriers such as those just mentioned, as well as lubricants.

Another way of administering orally the active ingredients here is in the form of aqueous solutions, syrups, elixirs, etc.

Suppositories containing the anti-tussive compounds here are readily obtained by techniques well known to those skilled in the art of compounding dosage forms. The active anti-tussive ingredient here, for example, can be dispersed in a carrier such as cocoa butter and suppositories formed in the usual way. Other carriers may likewise be used with equal facility.

Compositions suitable for parenteral administration are the known pharmaceutical forms for such administration, for example, sterile solutions of aqueous or oily media. The excipients used in these formulations are those excipients well known to the pharmacist. Aqueous formulations containing the active anti-tussive ingredients suitable for parenteral, especially intra-muscular administration, are those where the active portion is present in a concentration preferably ranging from about 0.5 to about 5% by weight.

A sterile aqueous isotonic solution for intravenous administration may be prepared by dissolving the anti-tussive compound in an appropriate medium, like, for instance, aqueous sodium chloride solution.

Depending on the nature of this specific condition this invention may be practiced in conjunction with the administration of other therapeutic agents. Thus, for example, the compounds described herein may be combined with aspirin, caffeine, barbiturates, phenacetin, amphetamines, magnesium sulfite and the like.

The quantity of the active compounds of the invention which is incorporated into the various compositions of the invention is variable within rather wide limits. For example, in the formulation of tablets, dragées and ampuls for injection there will be used from about 5 mg. to about 100 mg. of the active ingredient. The tablets, dragées and ampuls for injection which are prepared in the preferred practice of the invention contain from about 10 mg. to about 50 mg. of active compound. When provided in the form of a solution the active compound generally will comprise from 0.5% to about 4.0% and preferably from about 1.0% to about 3.0% of the weight of such solution. Moreover, when the compositions of this invention are provided in the form of a syrup, such syrup will contain from about 0.1% to about 4.0% and preferably from about 0.5% to 2.0% by weight of the active ingredient.

The frequency with which the compositions of this invention are administered to a patient requiring anti-tussive therapy will depend, to a great extent, upon the needs and requirements of the patient as determined by the prescribing physician. In general, it has been found that the compositions of this invention can be administered, at regular intervals, to provide up to about 200 mg. daily of the active ingredient. In a majority of instances, the daily administration of about 100 mg. will suffice for the intended purpose. Thus, for example, in the case of a tablet or capsule containing 20 mg. of the active ingredient, 1 or 2 such tablets or capsules can be administered up to 4 times a day. In the case of a tablet or capsule containing 50 mg. of the active ingredient, 1 such tablet or capsule can be administered up to 4 times a day or 2 such tablets or capsules can be administered up to 2 times a day. The compositions of the invention, in liquid form, will be administered within any desired regularity to provide up to about 200 mg. of the active ingredient per day.

In general then, the pharmaceutical compositions here in unit dosage form will contain 1–100 mg. of active ingredient. Further the daily dosage will range from about 0.25 mg./kg. to 4 mg./kg. and more often is 0.5–2.0 mg./kg.

As indicated heretofore, the active ingredient may either be in the form of the free base or acid or in the form of a medicinally acceptable acid or base addition salt. Thus, for example, the 2-phenylbutyric acid may be chemically transformed into a useful salt such as by reaction with an alkali metal base such as sodium hydroxide, potassium hydroxide, lithium hydroxide, etc. or by reaction with an alkaline earth metal base such as magnesium hydroxide, calcium hydroxide, etc. Again, useful salts may be formed by reacting the acid with an hydride such as sodium hydride or calcium hydride.

In like manner, the diethylaminoethoxy-ethanol base may be reacted with conventionally medicinally acceptable inorganic acids, such as hydrochloric acid, hydrobromic acid, sulfuric acid, nitric acid, phosphoric acid, etc. as well as with conventional medicinally acceptable organic acids such as citric acid, tartaric acid, maleic acid, fumaric acid, etc. These salts, when embodied in some suitable pharmaceutical or medicinal carrier are equally useful as anti-tussive agents.

The compounds disclosed as useful anti-tussive agents here were tested according to the method of Sanzari et al., J. Pharmacol. Exper. Therp., 162, 190 (1968). In this method, 1,1 - dimethyl - 4 - phenyl-piperazinium iodide (DMPP), a ganglionic stimulating agent, is used to evoke coughs.

In the first series of studies intravenous anti-tussive activities of 2-phenylbutyric acid and diethylaminoethoxy-ethanol were determined in cats based on a fixed dose challenge technique of DMPP. The anti-tussive agents were tested with respect to their activity in comparison to d-methorphan, a commercially available anti-tussive. In a fixed-dose technique of using DMPP, each animal is challenged with a fixed dose of DMPP (25–50 mcg./kg. I.V.) 15 minutes prior to and after pre-treatment with the anti-tussive drug. Several dose levels are assayed and the percent reduction of cough measured. The following results were noted.

TABLE I

| Anti-tussive agent | No. of cats used | Dose for 50% red. in cough, mg./kg. | Activity related to d- I.V. methorphan |
|---|---|---|---|
| d-Methorphan | 11 | 0.89 | 1.0 |
| Diethylamino-ethoxy-ethanol | 6 | 2.5 | 0.4 |
| 2-phenylbutyric acid | 6 | 2.6 | 0.4 |

The mixture of 2-phenylbutyric acid and diethylaminoethoxy-ethanol appeared to be almost equivalent in activity with d-methorphan.

In another series of studies the oral anti-tussive activity of a mixture of 2-phenylbutyric acid and diethylaminoethoxy-ethanol were studied. Again the fixed-dose of DMPP challenge was utilized, with DMPP being administered intravenously. The mixture present in a mole to mole basis was fed to an anesthesized cat in a sterile aqueous solution. Results are given in Table II below. The time in minutes with respect to the anti-tussive drug mixture means the lapse of time which has occurred after treatment with a drug followed by treatment with DMPP. The number of coughs were then measured at the various lapsed periods of time.

TABLE II

| Time in minutes | Pretreatment dose in mg./kg. | Dose DMPP challenge in mcg./kg. | No. of coughs | Percent cough supression |
|---|---|---|---|---|
| 0 | None | 25 | 2 | |
| 15 | do | 50 | 5 | |
| 30 | do | 50 | 4 | |
| 0 | Mixture [1] | | | |
| 15 | do.[1] | 50 | 2 | 60 |
| 30 | do.[1] | 50 | 2 | 60 |
| 45 | do.[1] | 50 | 1 | 80 |
| 60 | do.[1] | 50 | 1 | 80 |
| 75 | do.[1] | 50 | 1 | 80 |
| 90 | do.[1] | 50 | 2 | 80 |
| 105 | do.[1] | 50 | 1 | 80 |
| 120 | do.[1] | 50 | 1 | 80 |

[1] Mixture consists of 8.25 mg./kg. of 2-phenylbutyric acid and 8.1 mg./kg. of diethylaminoethoxy-ethanol (equivalent to 0.05 mM/kg. of each). This dose was given at $t=0$ time.

What is claimed is:

1. A method of treating a patient requiring anti-tussive therapy which comprises the step of administering to said patient 0.25 mg./kg. to 4 mg./kg. of body weight daily of a composition comprising (a) a member selected from the group consisting of 2-phenylbutyric acid, diethylaminoethoxy-ethanol, mixtures of 2-phenylbutyric acid and diethylaminoethoxy-ethanol, and medicinally acceptable acid or base addition salts of the foregoing and (b) a pharmaceutical carrier.

2. The method of claim 1 wherein said member is 2-phenyl butyric acid.

3. The method of claim 1 wherein said member is diethylaminoethoxy-ethanol.

4. The method of claim 1 wherein said member is the salt of 2-phenylbutyric acid.

5. The method of claim 1 wherein said member is the salt of diethylaminoethoxy-ethanol.

6. The method of claim 1 wherein said member is a mixture of 2-phenylbutyric acid and diethylaminoethoxy-ethanol.

7. The method of claim 1 wherein said member is the salt of 2-phenylbutyric acid and diethylaminoethoxy-ethanol.

8. The method of claim 1 wherein said member is 2-phenylbutyric acid and the salt of diethylaminoethoxy-ethanol.

9. The method of claim 1 wherein said member is the salt of 2-phenylbutyric acid and the salt of diethylaminoethoxy-ethanol.

References Cited

UNITED STATES PATENTS 3,349,114  10/1967  Heusser _____ 260—477

OTHER REFERENCES

Koss: Chemical Abstracts, 61:12492a.
Chemical Abstracts, 58:3359e.
Chemical Abstracts, 68:95553y.

ALBERT T. MEYERS, Primary Examiner
N. A. DREZIN, Assistant Examiner

U.S. Cl. X.R.
424—343